Figure 1:
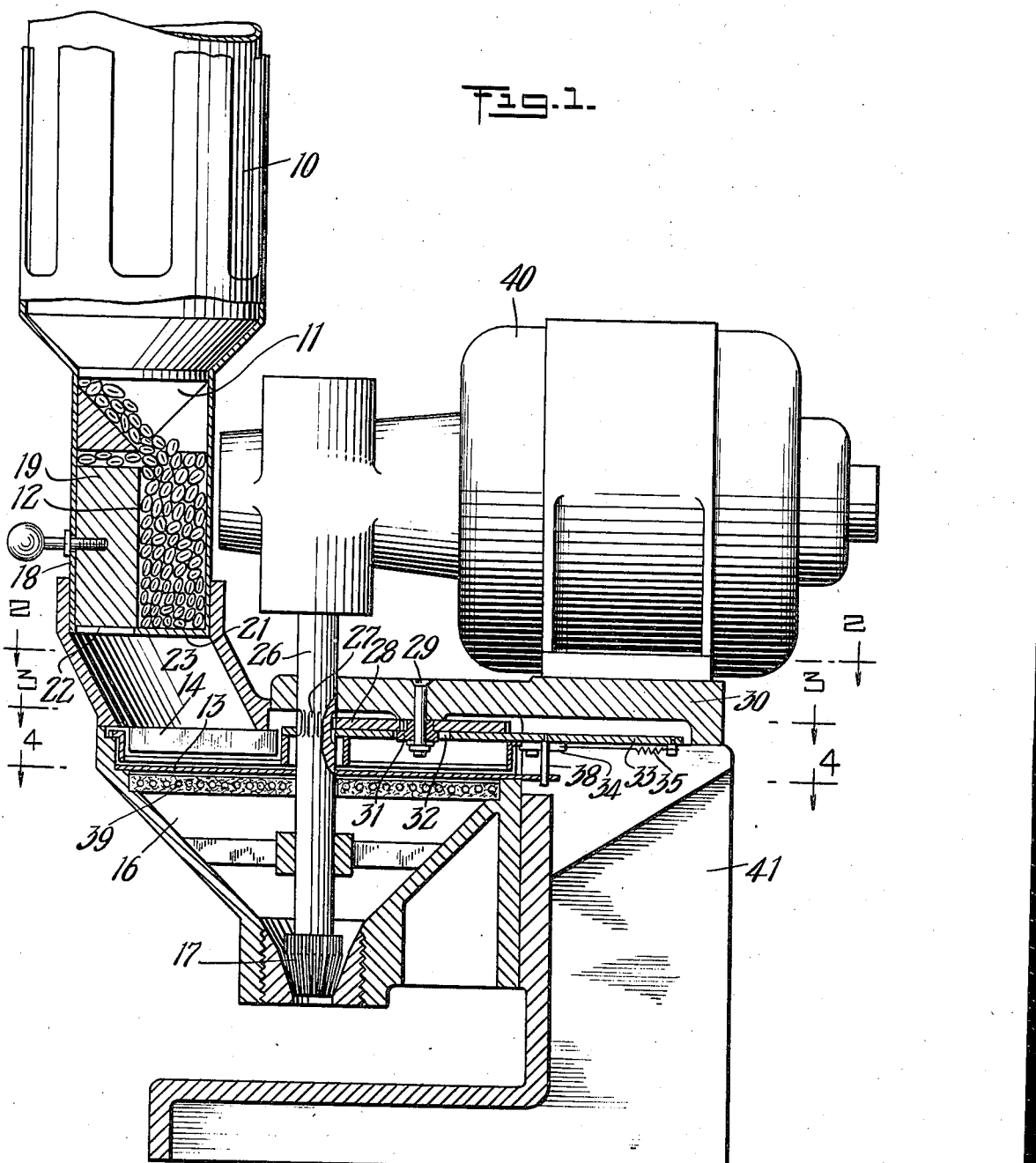

June 16, 1936. A. KARLSSON-YGGER 2,044,489
COMBINED ROASTING AND GRINDING MACHINE
Original Filed Oct. 19, 1932 2 Sheets-Sheet 1

INVENTOR.
Albert Karlsson-Ygger
BY
ATTORNEY.

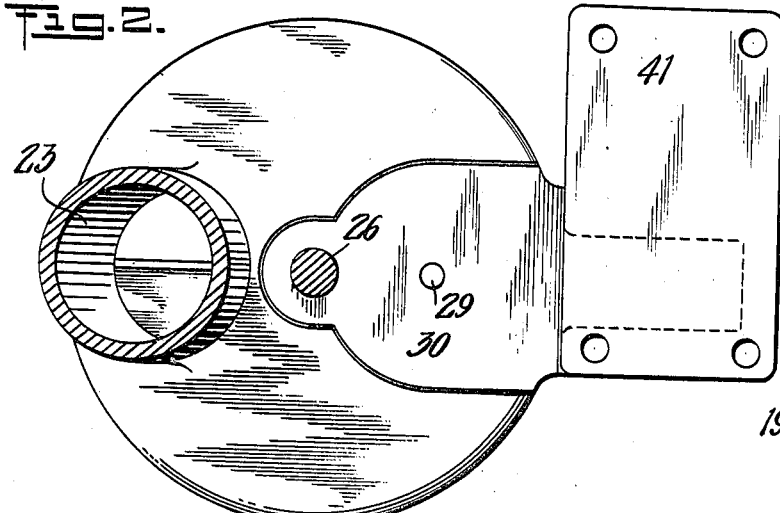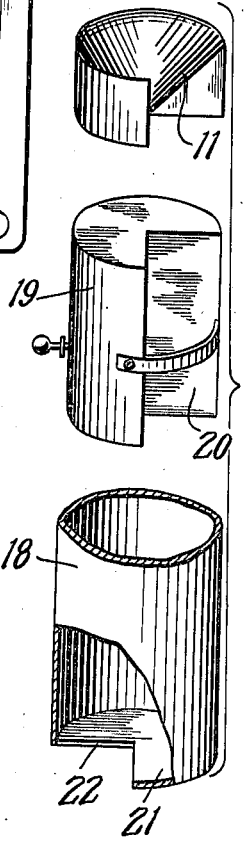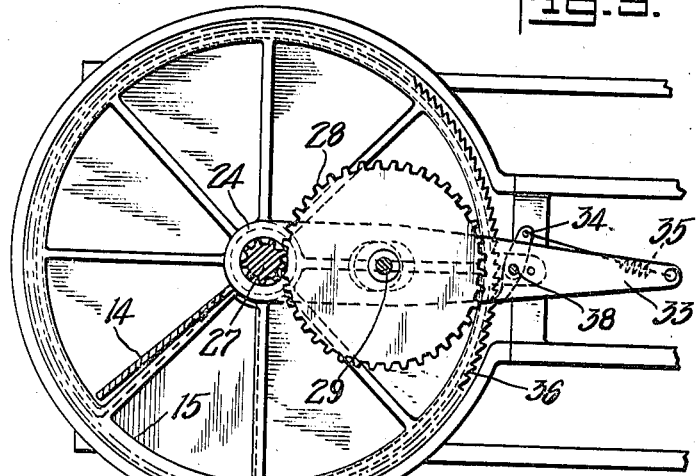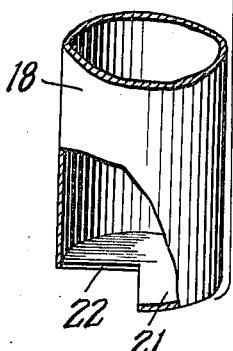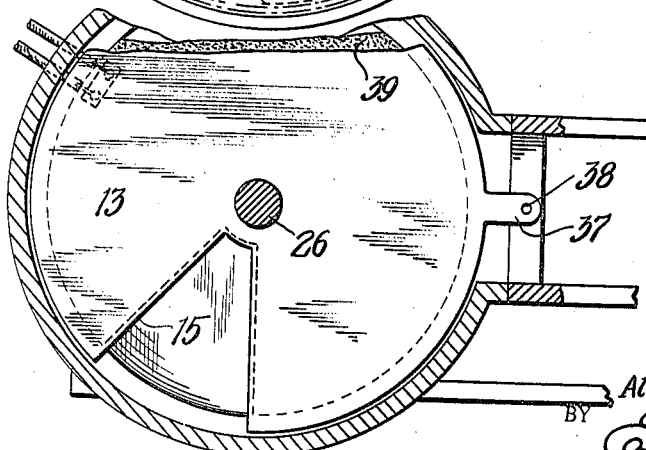

Patented June 16, 1936

2,044,489

UNITED STATES PATENT OFFICE 2,044,489

COMBINED ROASTING AND GRINDING MACHINE

Albert Karlsson-Ygger, New York, N. Y., assignor to Lydia B. Koch, New York, N. Y.

Refiled for abandoned application Serial No. 638,452, October 19, 1932. This application October 16, 1935, Serial No. 45,205

4 Claims. (Cl. 34—23)

This invention relates to a combined roasting and grinding machine, and more particularly to a machine for roasting and grinding coffee.

Among the principal objects which the present invention has in view are: To provide a machine for receiving the raw bean and deliver a measured quantity of roasted and ground coffee; to roast each measured quantity by itself; to keep the measured quantities from mixing; to assure complete roasting of the coffee before grinding the bean; to prevent the bean from becoming burnt while roasting; to provide a compact association of parts; to utilize a single motor; to secure simplicity of construction and operation; and to obtain advantages and results as may be brought out in the following description.

In the drawings:

Figure 1 is a vertical central section of a machine embodying my invention;

Figures 2, 3, and 4 are cross sectional views thereof taken on the lines 2—2, 3—3, and 4—4 respectively, and Figure 5 is a separated perspective view of the parts making up the measuring device.

Description

As seen in the drawings, the reference numeral 10, designates a hopper having a lower discharge passage 11 of restricted area and forming part of a measuring device designated generally by numeral 12, and by manipulation of which a measured quantity of the contents of the hopper may be received and then discharged without permitting more of said contents to flow past the measuring device. The measured quantity of said contents, for instance raw coffee bean, is discharged from the measuring device to a roasting plate 13, and confined to a definite area of the plate at any given moment by means of vanes 14 superposed upon the plate and here shown as divergent.

The vanes are simultaneously advanced in a circular direction so as to move the measured quantity of the coffee beans out from under the measuring device and eventually to a discharge opening 15 in said plate. The beans then drop into a chamber 16, the bottom wall of which is shown funnel-shaped or converging to bring the coffee to a grinder 17, which grinds the beans and discharges the ground coffee to any suitable receptacle (not shown) beneath the grinder.

The measuring device 12 mentioned above, may conveniently comprise an outer casing or sleeve 18 within which is mounted a valve 19 shown as substantially cylindrical having a longitudinal passageway 20 along one side thereof. This valve may be rotated an amount at least sufficient to displace the passageway from one position to an entirely new position, which does not overlap. The previously mentioned discharge passage 11 from the hopper is preferably shaped in cross section to substantially correspond to and register with the upper end of the said passageway in one of the positions of the valve, but to be entirely out of registration in the other extreme position of the valve. The bottom 21 of the casing or sleeve 18 is juxtaposed to the lower end of the valve, and said bottom has an opening 22 therein of similar shape and size as the opening or discharge passage 11 but not aligned therewith. That is to say, said bottom opening 11 is entirely out of registration with the valve passageway 20 when that passageway is in registration in whole or in part with said upper opening or passage 11, and consequently, when the valve passageway 20 has been filled by beans from the hopper and then turned so as to receive no more beans, a continued turning will bring the passageway 20 into registration with the opening 22, in the bottom wall 21 of the casing, thereby permitting the beans from the passageway 20 to drop, but no others.

The sleeve 18 of the measuring device is shown carried in the upper end of a hollow neck 23, the lower end of which is opened and overlies a part of the roasting plate 13 abovementioned. As here shown, the roasting plate is circular in configuration and the said lower end of the neck 23 is positioned to overlie a portion of the plate at one side of the center thereof between such center and one portion of the periphery of the plate. For convenience this relationship of neck to the plate will be referred to as eccentric. The lower end of the said neck is spaced from the roasting plate a distance substantially equal to the height of the vane 14' and vanes 14, thereby permitting passage of the vanes 14 between the plate and vane 14'. The vanes are preferably integrally formed with a central hub 24 and outer rim 25 and are shown extending radially therebetween. The parts are so related that the beans will be pushed upon the plate by a vane as the vane revolves, until that vane has completed the greater part of a single orbital movement before the beans come into registration with the discharge opening and thus the roasting operation continues for the period of that greater part of the movement. Furthermore, it is to be noted that the several vanes in conjunction with the hub 24 and rim 25 provide compartments for confining the beans and preventing the same from spreading or some discharging materially in advance of others.

The rotary advancement of the vanes is preferably with a relatively slow movement, and as here shown is a step by step movement. I have shown a vertically disposed drive shaft 26 passing centrally through both the hub 24 for the vanes and the roasting plate 13, but not in driving contact with either of those parts. This shaft 26, at a point above the vanes may be circumferentially toothed, as at 27, so as to provide in effect, a driving pinion. Also above the vanes is a gear 28 shown parallel to the roasting plate and in mesh with the pinion or driving teeth 27. A stud or bolt 29 through the center of this gear mounts the same rotatably to a fixed part of the machine, for instance, to housing 30. Depending from said gear and fast with respect thereto is an eccentric 31 which operates within a longitudinal slot 32 in a horizontally rocking arm 33 interposed between the gear and the vanes. The inner end of the arm rotatably receives the drive shaft therethrough as a convenient means of pivotal support. An outer part of said arm 33 carries a pawl 34 having a spring 35 attached thereto for actuating the pawl into operative engagement with ratchet teeth 36 extending entirely around the rim 25 for the vanes. Rotation of the gear rotates the eccentric which oscillates the arm and intermittently advances the vanes through the pawl and ratchet operation.

In order to agitate the beans while in contact with the roasting plate 13, I have shown means for vibrating the roasting plate. This means may conveniently include a tab or ear 37 projecting radially from the plate beneath the rocking arm 33, with a pin 38 depending from the arm into the ear. As a result of this construction, each swing of the arm obtains a corresponding movement of the plate which is accordingly vibrated back and forth.

It will be understood that the roasting plate 13 is heated in any suitable manner, for instance, by an electric heating element 39 substantially the entire area thereof but having an opening in registration with the opening through the plate for passing the roasted beans to the chamber 16. The drive shaft 26 likewise passes through the heating element and carries the grinder 17 at its lower end. The upper end of said shaft is driven by a suitable source of power; for instance, electric motor 40 carried upon housing 30. The housing is secured with respect to a standard 41, the lower end of which acts both as a foot and as a table underlying the grinder 17 but spaced therefrom so as to receive a suitable container, (not shown) for the ground coffee discharged by the grinder.

This application is a substitute for abandoned application No. 638,452, filed Oct. 19, 1932.

I claim:

1. A machine as characterized comprising a roasting plate having a discharge opening therethrough, and having a circular periphery provided with ratchet teeth, a vane overlying said plate and revolvable substantially in contact therewith, a pivoted arm above said vane, means for oscillating said arm, a pawl carried by said arm and associated with said ratchet teeth for actuating said vane with a step by step movement, and a pin connection between said arm and plate for vibrating said plate during the roasting operation.

2. A machine as characterized comprising means for roasting coffee or the like, other means for introducing a measured supply of coffee, said other means comprising an outer casing, and a valve within said casing having a longitudinal passageway, said valve adapted to be rotatable for registering the passageway with said roasting means whereby the measured supply of coffee will pass thereto and preventing steady flow of coffee in excess of the measured amount, said coffee passing to said roasting means, the roasting means having a circular periphery and provided with ratchet teeth, vanes overlying said roasting means and revolvable substantially in contact therewith, a pivoted arm above said vanes, other means for oscillating said arm, a pawl carried by said arm and associated with said ratchet teeth for actuating said vane with a step-by-step movement, and a pin connection between said arm and plate for vibrating said plate during the roasting operation after the measured amount of coffee has been deposited on said roasting means.

3. A machine as characterized comprising means for roasting coffee or the like, other means for introducing a measured supply of coffee, said other means comprising an outer casing, and a valve within said casing having a longitudinal passageway, said valve adapted to be rotatable for registering the passageway with said roasting means whereby the measured supply of coffee will pass thereto and preventing steady flow of coffee in excess of the measured amount, and other means for moving the measured supply of coffee from its position of reception by the roasting means for clearing said roasting means to receive another measured supply of the coffee, said coffee passing to said roasting means, the roasting means having a circular periphery and provided with ratchet teeth, vanes overlying said roasting means and revolvable substantially in contact therewith, a pivoted arm above said vanes, other means for oscillating said arm, a pawl carried by said arm and associated with said ratchet teeth for actuating said vane with a step-by-step movement, and a pin connection between said arm and plate for vibrating said plate during the roasting operation after the measured amount of coffee has been deposited on said roasting means.

4. A machine as characterized comprising means for roasting coffee or the like, other means for introducing a measured supply of coffee, said other means comprising an outer casing, and a valve within said casing having a longitudinal passageway, said valve adapted to be rotatable for registering the passageway with said roasting means whereby the measured supply of coffee will pass thereto and preventing steady flow of coffee in excess of the measured amount, said roasting means having an opening for discharging the coffee when roasted, said opening being offset from the point of introduction of the coffee to the roasting means, and means for moving the supply of coffee from its point of introduction to the plate through a circuitous path to said opening for clearing said roasting means to receive another supply of coffee, said coffee passing to said roasting means, the roasting means having a circular periphery and provided with ratchet teeth, vanes overlying said roasting means and revolvable substantially in contact therewith, a pivoted arm above said vanes, other means for oscillating said arm, a pawl carried by said arm and associated with said ratchet teeth for actuating said vane with a step-by-step movement, and a pin connection between said arm and plate for vibrating said plate during the roasting operation after the measured amount of coffee has been deposited on said roasting means.

ALBERT KARLSSON-YGGER.